United States Patent
Smith et al.

(10) Patent No.: US 10,034,153 B1
(45) Date of Patent: Jul. 24, 2018

(54) CREATION AND USE OF MOBILE COMMUNICATIONS DEVICE IDENTITIES

(71) Applicant: Securus Technologies, Inc., Dallas, TX (US)

(72) Inventors: Matthew Smith, McKinney, TX (US); Mark Baker, Palm Bay, FL (US)

(73) Assignee: Securus Technologies, Inc., Carrollton, TX (US)

( * ) Notice: Subject to any disclaimer, the term of this patent is extended or adjusted under 35 U.S.C. 154(b) by 0 days.

(21) Appl. No.: 14/946,030

(22) Filed: Nov. 19, 2015

(51) Int. Cl.
  *H04M 3/42* (2006.01)
  *H04W 4/16* (2009.01)
  *H04L 29/08* (2006.01)

(52) U.S. Cl.
  CPC .............. *H04W 4/16* (2013.01); *H04L 67/12* (2013.01)

(58) Field of Classification Search
  CPC ..... H04W 12/12; H04W 12/06; H04W 8/245; H04W 8/183; H04W 92/02; H04W 60/00; H04W 80/04; H04L 2012/5607
  USPC ...... 455/410, 411, 418, 432.1, 432.2, 435.1; 370/310.2, 328
  See application file for complete search history.

(56) References Cited

U.S. PATENT DOCUMENTS

| | | | | |
|---|---|---|---|---|
| 5,765,105 A | * | 6/1998 | Kuriki | H04W 8/183 455/410 |
| 6,091,946 A | * | 7/2000 | Ahvenainen | H04W 12/06 455/411 |
| 6,119,000 A | * | 9/2000 | Stephenson | H04M 3/36 455/432.1 |
| 8,010,083 B2 | * | 8/2011 | Descombes | H04M 3/229 455/406 |
| 8,205,080 B2 | * | 6/2012 | Calamera | H04L 9/3234 380/270 |
| 9,654,357 B2 | * | 5/2017 | Fox | H04L 41/5025 |
| 2001/0053684 A1 | * | 12/2001 | Pirila | H04W 12/12 455/410 |
| 2002/0120873 A1 | * | 8/2002 | Salmivalli | H04W 12/12 726/32 |
| 2003/0027581 A1 | * | 2/2003 | Jokinen | H04W 8/04 455/456.1 |

(Continued)

*Primary Examiner* — Steve D Agosta
(74) *Attorney, Agent, or Firm* — Fogarty LLP

(57) ABSTRACT

Systems and methods for creation of a device identity (ID) for mobile communications devices may capture equipment identification information and subscriber identification information for mobile communications devices and combine them to create a device identity for each pairing of equipment identification information and subscriber identification information captured. Such mobile communications devices, may be operating in association with a controlled-environment facility and the equipment identification information and subscriber identification information are captured by a controlled-environment facility mobile communications managed access system (central access point) and/or by a controlled-environment facility contraband mobile communications device assessment system (access point(s)). Thus, the device identity for each pairing of equipment identification information and subscriber identification information may be for mobile communication devices operating in association with the controlled-environment facility, including contraband communications devices operating within the facility.

10 Claims, 2 Drawing Sheets

(56) References Cited

U.S. PATENT DOCUMENTS

| | | | |
|---|---|---|---|
| 2004/0005875 A1* | 1/2004 | Ko | H04W 12/12 455/410 |
| 2004/0047332 A1* | 3/2004 | Bensimon | H04W 74/04 370/347 |
| 2004/0082346 A1* | 4/2004 | Skytt | H04W 24/02 455/456.3 |
| 2004/0180676 A1* | 9/2004 | Haumont | H04W 8/26 455/461 |
| 2005/0107100 A1* | 5/2005 | Gustafsson | H04W 8/18 455/466 |
| 2005/0117554 A1* | 6/2005 | Bleckert | H04W 8/245 370/338 |
| 2007/0173251 A1* | 7/2007 | Vikberg | H04W 48/04 455/428 |
| 2008/0096555 A1* | 4/2008 | Herrmann | H04W 8/265 455/435.1 |
| 2010/0064341 A1* | 3/2010 | Aldera | H04L 63/102 726/1 |
| 2012/0159599 A1* | 6/2012 | Szoke | G06F 21/32 726/7 |
| 2012/0324536 A1* | 12/2012 | McDysan | H04L 12/4641 726/3 |
| 2014/0379480 A1* | 12/2014 | Rao | G06F 8/00 705/14.58 |

* cited by examiner

CREATION AND USE OF MOBILE COMMUNICATIONS DEVICE IDENTITIES

TECHNICAL FIELD

The present disclosure relates generally to wireless communications, and more particularly to creation and use of mobile communications device identities, which may be used as a mobile communication Managed Access System (MAS) User Interface (UI) device Identity (ID), and the like.

BACKGROUND

According to the International Centre for Prison Studies, the United States has the highest prison population per capita in the world. In 2009, for example, 1 out of every 135 U.S. residents was incarcerated. Generally, inmates convicted of felony offenses serve long sentences in prison (e.g., federal or state prisons), whereas those convicted of misdemeanors receive shorter sentences to be served in jail (e.g., county jail). In either case, while awaiting trial, a suspect or accused may remain incarcerated. During his or her incarceration, an inmate may have opportunities to communicate with the outside world.

By allowing prisoners to have some contact with friends and family while incarcerated, the justice system aims to facilitate their transition back into society upon release. Traditional forms of contact include telephone calls, in-person visitation, conjugal visits, etc. More recently, technological advances have allowed jails and prisons to provide other types of visitation, including individual-to-individual videoconferences and online chat sessions.

Traditional communication services of controlled-environment facilities (such as correctional facilities) include allowing residents (inmates) to place outbound phone calls to non-residents of the controlled-environment facility. Additionally, non-residents can typically schedule video visitation with residents (inmates) of the controlled-environment facility. Other types of communications available to controlled-environment residents include the ability to exchange email and canned text messages between residents and non-residents of the controlled-environment facility. Basically, all of these forms of communication aim to facilitate communication between a resident of a controlled-environment facility and a non-resident.

However, residents of controlled-environment facilities are typically restricted from unauthorized communications with individuals outside of the controlled-environment facility. For example, in correctional facilities inmates are typically prohibited from unauthorized communications with individuals outside of the correctional facility. Thus, in many controlled-environment facilities, unauthorized cell phones, smartphones, tablet computing devices, and other mobile communications devices that circumvent facility communication systems may be considered contraband. Further, in most correctional institutions, or the like possession of a contraband communications device is considered a violation of facility rules and/or regulations, and therefor may be punishable. Often, once located, the contraband communications device is confiscated.

The use of contraband communications devices within controlled-environment facilities, such as correctional institutions, poses a risk to facility security, an avenue for continued criminal activity for correctional system inmates, and additionally a loss in revenues for facility operators and administration. Controlled-environment facility residents may obtain access to contraband devices through many different sources. Family and friends are a potential source. Similarly, facility staff (e.g. corrections officers) may be a potential source of contraband devices. For example, inmates, or associates of inmates, may pay a member of prison staff, such as a corrections officer or civilian worker, to smuggle a contraband communications device, such as a cell phone, into a correctional institution.

Residents may use the contraband communications device to circumvent facility communication systems, which are often monitored. During the course of communications, inmates may make incriminating admissions, commit further criminal acts, conspire to commit further criminal acts, or leave a trail of incriminating data. Ordinarily, these actions and admissions may be monitored by facility communication systems and investigators. By circumventing the facility communication system, however, it may not be possible to monitor such activities. For example, a correctional facility inmate may use a contraband cell phone to contact gang affiliates in an attempt to direct further criminal activity from within the facility. In another correctional environment example, an inmate may use a contraband smartphone or tablet device to access illegal images, including images of child pornography. In a general controlled-environment facility example, a resident may use the contraband communications device to contact friends and family in an effort to avoid payment of communications fees. Additionally, facilities typically make use of revenues derived from a resident's use of facility communication systems to operate, update, and maintain the facility communications system. When a resident circumvents the facility communication systems, financial revenue is lost, which could otherwise benefit the facility and other inmates and administration thereof. Many other illegal or illicit acts may be perpetrated by the use of contraband communications devices.

Authorities operating the controlled-environment facility often try to identify and avoid unauthorized use of contraband communications equipment. There are some previously known methods for detecting and/or controlling access to contraband communications equipment including jamming of frequencies used for cell phone communications, managed access systems, and use of mobile detection equipment (e.g. "wands"), but some of these methods may have drawbacks. For example, jamming of communication frequencies is typically illegal in the United States. Mobile detection equipment may be circumvented by the inmates by simply turning the power off on the device. Also, over the past several years U.S. inmate population compared to funding for the jails has not been proportional. To the contrary, budget pressures in local, state, and federal governments have made it difficult for correctional facilities to maintain an adequate number of wardens, officers, and other administration personnel. Hence, many correctional facilities are often unable to perform investigations with respect to their own inmates, such as using mobile equipment to sweep for contraband mobile communications devices, or the like.

Managed access systems may allow access to corrections officers and/or staff, but limit access to unauthorized users within the facility. Under such managed access systems or similar mobile communications systems, mobile Communications Detail Records (CRDs) typically include identifiers of the mobile phone and account, which include two minimal numbers to be taken into account by the system when processing calls, detecting contraband devices, or the like, the International Mobile Station Equipment Identity (IMEI) and the International Mobile Subscriber Identity (IMSI)

number, or the Mobile Equipment Identifier (MEID) and the Mobile Identification Number (MIN), depending on which communications technology the mobile device uses.

SUMMARY

The present invention is directed to systems and methods which provide for creation of a Device Identity (ID) for mobile communications devices. Therein, equipment identification information and subscriber identification information for mobile communications devices is captured and combined to create a device identity for each pairing of equipment identification information and subscriber identification information captured.

Embodiments of a system for creation of a device ID for mobile communications devices may include, and/or methods may employ, one or more access points configured to monitor wireless/mobile communications and capture equipment identification information and subscriber identification information for mobile communications devices carrying out the wireless/mobile communications. An analysis module, or the like may be configured to combine captured equipment identification information and subscriber identification information for each mobile communications device to create the device identity for each pairing of equipment identification information and subscriber identification information captured.

In some environments, the mobile communications devices may be operating in association with a controlled-environment facility and the equipment identification information. In such embodiments, equipment identification information and subscriber identification information are captured by a controlled-environment facility mobile communications Managed Access System (MAS) using a central access point of the MAS and/or by a controlled-environment facility contraband mobile communications device assessment system. Therein, the device identity for each pairing of equipment identification information and subscriber identification information for mobile communications captured is for mobile communication devices operating in association with the controlled-environment facility. Such mobile communications devices operating in association with a controlled-environment facility may be contraband mobile communications devices operating in (within) the controlled-environment facility.

In various embodiments, one or more of the techniques described herein may be performed by one or more computer systems. In other various embodiments, a tangible computer-readable storage medium may have program instructions stored thereon that, upon execution by one or more computer systems, cause the one or more computer systems to execute one or more operations disclosed herein. In yet other various embodiments, one or more systems may each include at least one processor and memory coupled to the processor(s), wherein the memory is configured to store program instructions executable by the processor(s) to cause the system(s) to execute one or more operations disclosed herein.

Hence, in accordance with embodiments of the present systems and methods one or more computer systems comprising a controlled-environment facility mobile communications access system a controlled-environment facility contraband mobile communications device assessment system, or the like may be caused to monitor wireless/mobile communications originating in and/or terminating within the controlled-environment facility and capture equipment identification information and subscriber identification information for each mobile communications device monitored. Such equipment identification information and subscriber identification information captured for each mobile communications device operating within the controlled-environment facility may, as noted, be combined to create a device identity (ID) for each pairing of equipment identification information and subscriber identification information for mobile communications devices operating within the controlled-environment facility.

The equipment identification information captured and used in conjunction with the present systems and methods may be an International Mobile Station Equipment Identity (IMEI) and the subscriber identification information may be an International Mobile Subscriber Identity (IMSI) for corresponding mobile communications devices for which identification information is captured. Additionally and alternatively, the equipment identification information may be a Mobile Equipment Identifier (MEID) and the subscriber identification information may be a Mobile Identification Number (MIN) for corresponding mobile communications devices for which identification information is captured.

In accordance with various embodiments of the present systems and methods, combining the equipment identification information and subscriber identification information captured for each mobile communications device may entail performing a mathematical operation to combine the subscriber identification information and equipment identification information to create the device identity for each pairing of equipment identification information and subscriber identification information captured. This mathematical operation may be a hexadecimal operation. Alternatively, or additionally, combining the equipment identification information and subscriber identification information may append elements of each of the subscriber identification information and the equipment identification information together to create the device identity for each pairing.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

Figure 1:
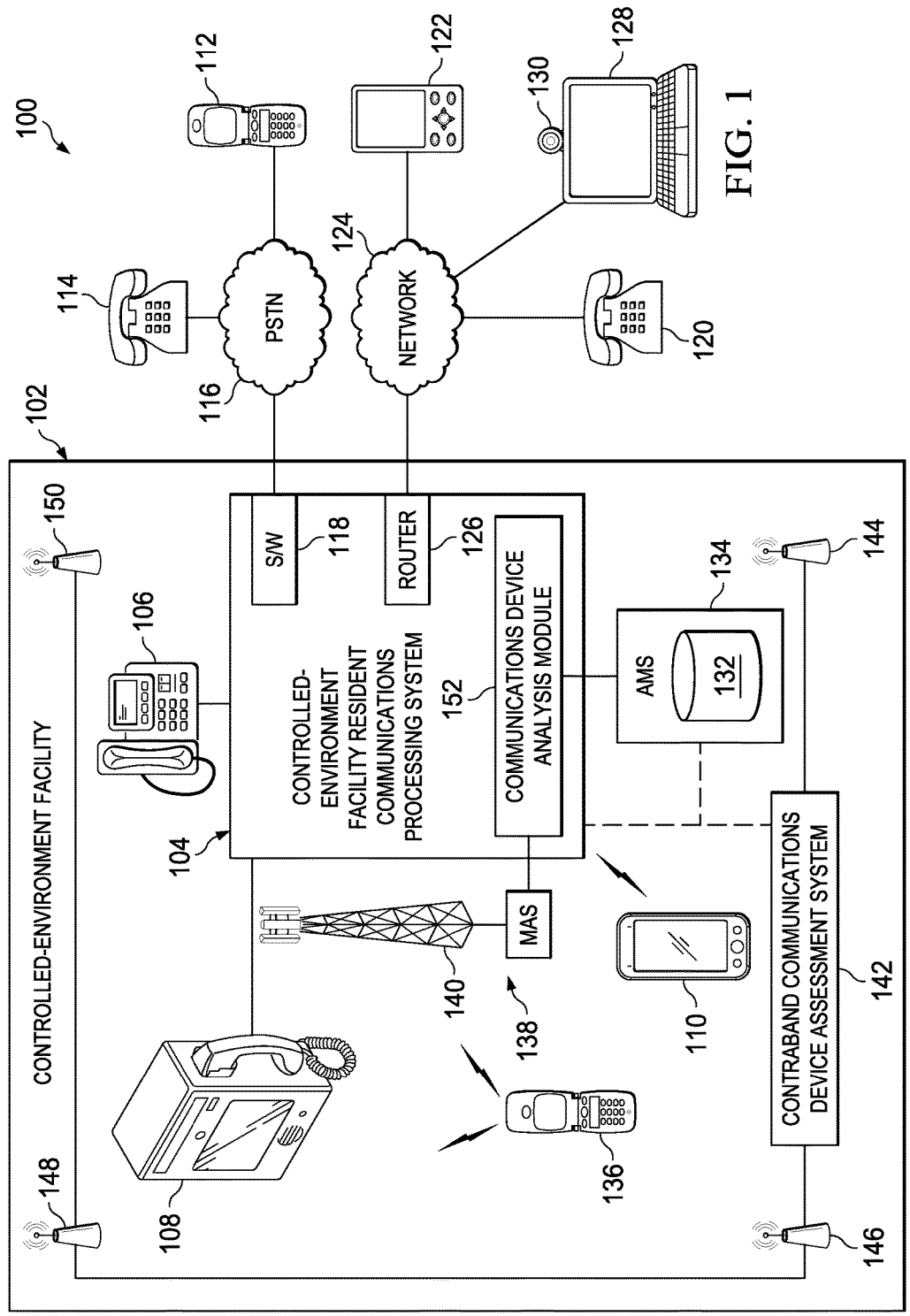
Figure 2:
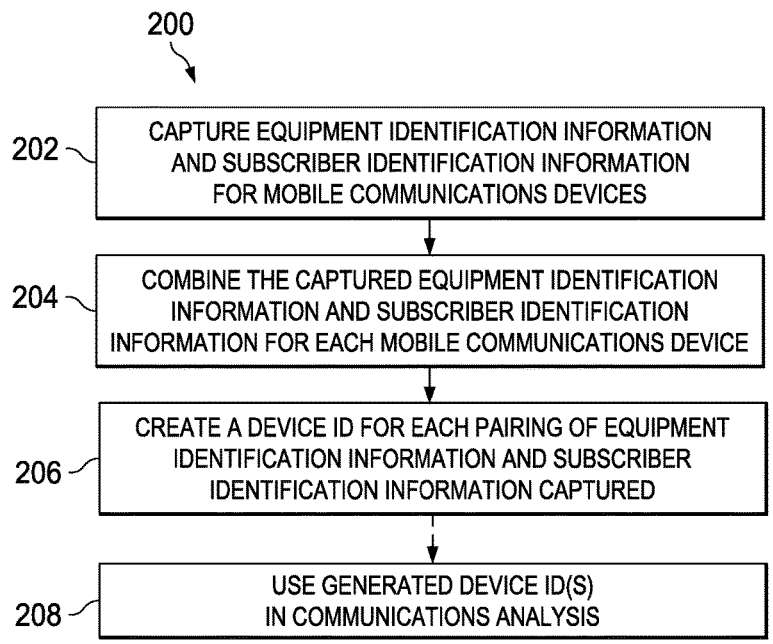
Figure 3:
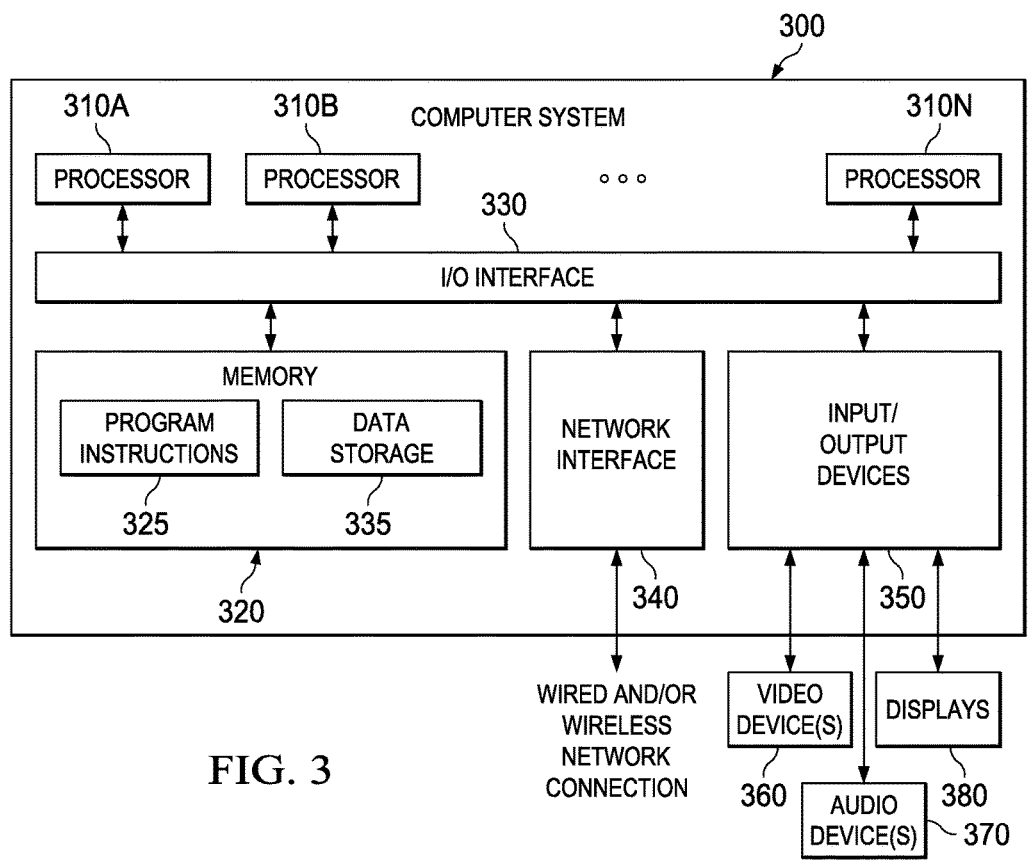

Having thus described the invention in general terms, reference will now be made to the accompanying drawings, which are not necessarily drawn to scale, and wherein:

FIG. 1 is a diagrammatic illustration of an example communications environment, wherein an example embodiment of the present systems and methods for creation and use of mobile communications device identities is deployed in conjunction with a controlled-environment facility, according to some embodiments of the present systems and methods;

FIG. 2 is a flowchart of an example process for creation and use of mobile communications device identities, in accordance with some embodiments; and FIG. 3 is a block diagram of a computer system, device, station, or terminal configured to implement various techniques disclosed herein, according to some embodiments.

While this specification provides several embodiments and illustrative drawings, a person of ordinary skill in the art will recognize that the present specification is not limited only to the embodiments or drawings described. It should be understood that the drawings and detailed description are not intended to limit the specification to the particular form disclosed, but, on the contrary, the intention is to cover all modifications, equivalents and alternatives falling within the spirit and scope of the claims. As used herein, the word "may" is meant to convey a permissive sense (i.e., meaning "having the potential to"), rather than a mandatory sense (i.e., meaning "must"). Similarly, the words "include," "including," and "includes" mean "including, but not limited to."

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

For example, various types of controlled-environment facilities are present in today's society, and persons may be voluntary or involuntary residents of such facilities, whether temporarily or permanently. Examples of controlled-environment facilities may include correctional institutions (e.g., municipal jails, county jails, state prisons, federal prisons, military stockades, juvenile facilities, detention camps, home incarceration environments, etc.), healthcare facilities (e.g., hospitals, nursing homes, mental health facilities, rehabilitation facilities, such as drug and alcohol rehabilitation facilities, etc.), restricted living quarters (e.g., hotels, resorts, camps, dormitories, barracks, etc.), and the like. For convenience of explanation, various examples discussed herein are presented in the context of correctional facilities, or the like. For instance, in some of the embodiments discussed below, a controlled-environment facility may be referred to as a correctional facility, jail or prison, and its residents may be referred to as inmates, arrestees, or detainees. It should be understood, however, that the systems and methods described herein may be similarly applicable to other types of controlled-environment facilities and their respective residents (e.g., a hospital and its patients, a school dormitory and its students, etc.).

Embodiments of the present systems and methods relate generally to wireless communications, and more particularly to creation and use of unique mobile communications device identity (ID), which may be used as a mobile communication Managed Access System (MAS) User Interface (UI) device ID, and the like. System and method embodiments may create a device identity (ID) for mobile communications devices by capturing equipment identification information and subscriber identification information for mobile communications devices and combining them to create a device identity for each pairing of equipment identification information and subscriber identification information captured. Such mobile communications devices, may be operating in association with a controlled-environment facility and the equipment identification information and subscriber identification information are captured by a controlled-environment facility mobile communications managed access system (central access point) and/or by a controlled-environment facility contraband mobile communications device assessment system (access point(s)). Thus, the device identity for each pairing of equipment identification information and subscriber identification information may be for mobile communication devices operating in association with the controlled-environment facility, including contraband communications devices operating within the facility.

As noted, cellular telephone mobile Communications Detail Records (CRDs) include identifiers of the cellular phone and account, which include two minimal numbers to be taken into account by managed access systems or the like, the IMEI and IMSI or MEID and MIN depending on which wireless communications technology the subject mobile communications device uses. The International Mobile Station Equipment Identity (IMEI) is a number, usually unique, that identifies a 3rd Generation Partnership Project (3GPP) (i.e., GSM, UMTS and LTE) and Integrated Digital Enhanced Network (iDEN) mobile communications device, as well as some satellite phones. It is usually found printed inside the battery compartment of the phone, but can also be displayed on-screen on most devices. The IMEI is used by GSM networks and the like to identify valid devices. The IMEI is only used for identifying the device and has no permanent or semi-permanent relation to the subscriber. Rather, the subscriber is identified by transmission of an International Mobile Subscriber Identity (IMSI) number, which is stored on a Subscriber Identity Module or Subscriber Identification Module (SIM (card)) that can be transferred to another mobile communications device. An IMSI is usually presented as a fifteen-digit number (but can be shorter). The first 3 digits are typically a mobile country code, which are followed by a mobile network code that is three digits (North American standard). The remaining digits are typically a mobile subscription identification number (MSIN) within a home network's customer base. The IMSI may be analyzed or examined to identify the network the IMSI belongs to, and whether subscribers from that network may use a given network, as a network customer, or as a roaming customer.

A Mobile Equipment Identifier (MEID) is a globally unique number identifying a physical piece of Code Division Multiple Access (CDMA) mobile communications equipment. The number format is defined by a 3GPP standard and employs hexadecimal digits. The MEID was created to replace Electronic Serial Numbers (ESNs). A Mobile Identification Number (MIN) (or Mobile Subscription Identification Number (MSIN)) refers to a 10-digit unique number that a wireless carrier uses to identify a mobile communications subscriber in a CDMA system, typically corresponding to a mobile telephone number.

To date the two different identifiers, either IMEI and IMSI, or MEID and MIN, must be evaluated for both identifying numbers, thus multiple identifiers have to be taken into account to provide useful analytical tools and software to evaluate mobile communications data or mobile CDRs. This takes more time and effort to evaluate two different numbers and compare them and thus difficult or impossible for some specific analysis tools or software.

When paired together to uniquely identify this device in accordance with embodiments of the present systems and methods, the IMEI and IMSI or MEID and MIN, equals a particular mobile handset, employing a particular subscriber account, which is referred to herein as a "device identity," or "device ID.". When used in a controlled-environment facility, such as a correctional facility, this cellular telephone, if unauthorized, becomes a contraband communications device. A combination of the IMEI and IMSI may be seen as the IMEI equating to a serial number of the hardware device (the phone itself) and the IMSI equating to the SIM card or software identity of the account under which the device is activated. Together these make a unique GSM device and/or event within analytical software or in mobile CDRs, or the like. Similarly, under CDMA systems, a combination of the MEID and MIN may be seen as the MEID equating to a serial number of the hardware device (the phone itself) and the MIN equating to the software identity of the account under which the device is activated. Together these make a unique CDMA device and/or event within analytical software or in mobile CDRs, or the like. Embodiments of the present systems and methods take these two identifiers and mathematically combines them to create a unique single numeric device ID which can then be used in analytical software platforms to perform faster and more straightforward analysis, as one unique number is created to identify a device. This increases the number of analytical software methods that can be used to evaluate mobile communications data since only one numeric value is associated with one mobile communications event within CDRs and the like. Further, the use of one number as a device ID in communications systems interfaces may facilitate the use of such interfaces. Since the device ID is generated on the back end, as a result of a call attempt by a combination of a particular device using a particular subscriber account, it may be associated with a particular call and may be more easily associated with a particular caller (i.e. controlled-environment facility resident).

FIG. 1 is a diagrammatic illustration of example communications environment 100, wherein an example embodiment of the present systems and methods for creation and use of unique mobile communications device identity is deployed in conjunction with controlled-environment facility 102, according to some embodiments of the present systems and methods. Therein, controlled-environment facility resident communications processing system 104 may provide telephone services, videoconferencing, online chat, and other communication services to controlled-environment facility 102. For example, in some cases, communication system 104 may be co-located with a controlled-environment facility (102), such as illustrated in FIG. 1. Alternatively, communication system 104 may be centrally or remotely located with respect to one or more controlled-environment facilities and/or may provide communication services to multiple controlled-environment facilities. More generally, however, it should be noted that communication system 104 may assume a variety of forms, and may be configured to serve a variety of facilities and/or users, whether within or outside of a controlled-environment facility.

For instance, residents may access such services using telephones 106 to access certain communication services. In some facilities, residents may use video visitation device(s) 108, which may be referred to as an Intelligent Facility Devices (IFDs), personal computer wireless device 110 adapted or approved for use in controlled-environment facility 102, or the like. For example, a resident may initiate telephone services by lifting the receiver on telephone 106 or IFD 108, or by launching a communication application program on device 110, at which time the resident may be prompted to provide a personal identification number (PIN), other identifying information or biometrics. An interactive voice response (IVR) unit (not shown) may generate and play prompt or other messages to residents on devices 106, 108 and/or 110.

Under the control of communication processing system 104, devices 106, 108 and 110 may be capable of connecting to a non-resident's (i.e., a person not committed to a controlled-environment facility) device 112 or telephone 114 across a publicly switched telephone network (PSTN) 116. For example, device 112 may be a mobile phone, whereas telephone 114 may be located at a non-resident's home or office, an inmate visitation center, etc. Switch 118 in communication processing system 104 may be used to connect calls across PSTN 116. Additionally or alternatively, the non-resident may be at telephone 120 or device 122, which is on an Integrated Services Digital Network (ISDN), Voice-over-IP (VoIP), or packet data network 124, such as, for example the Internet. Router 126 of communication system 104 is used to route data packets associated with a call connection to destination telephone 120 or device 122.

Video visitation device(s) (IFDs) 108 may have video conferencing capabilities to enable residents to participate in video visitation sessions with non-residents of the correctional facility via video call, secure online chat, etc. For example, a non-resident party may have a personal or laptop computer 128 with camera 130. Additionally or alternatively, device 128 may have an integrated camera and display (e.g., a smart phone, tablet computer, etc.). A network connection between the parties may be established and supported by an organization or commercial service that provides computer services and software for use in telecommunications and/or VOIP, such as SKYPE®. Additionally or alternatively, the correctional facility and/or the destination may use videoconferencing equipment compatible with ITU H.323, H.320, H.264, and/or V.80, or other suitable standards. Generally speaking, each video visitation device 108 may be disposed in a visitation room, in a pod, cell, etc. in controlled-environment facility 102.

In some embodiments, video visitation devices 108 may be implemented as a computer-based system. For example, each of video visitation devices 108 may include a display, camera, and handset. The display may be any suitable electronic display such as, for example, a Liquid Crystal Display (LCD), a touchscreen display (e.g., resistive, capacitive, etc.), or the like, whereas the camera may be a suitable imaging device such as, for instance, a video camera or webcam equipped with Charge-Coupled Devices (CCDs), Complementary Metal-Oxide-Semiconductor (CMOS) active pixel sensors, etc. A handset may be similar to a traditional telephone handset including an earpiece portion (with a loudspeaker), a handle portion, and a mouthpiece portion (with a microphone). During a video visitation session, video visitation devices 108 may be configured to capture a video image of a resident to be transmitted to a non-resident using the camera, and to display a video image of the non-resident to the resident using the display. Video visitation devices 108 may also be configured to capture an audio signal from the resident to be transmitted to a non-resident using the mouthpiece portion of the handset, and to provide an audio signal from the non-resident to the resident using the earpiece portion of the handset. Additionally or alternatively, audio received from the non-resident may be reproduced via a loudspeaker, and audio provided by the resident may be captured via a microphone. In some cases, video visitation devices 108 may assume the form of any computer, tablet computer, smart phone, etc., or any other consumer device or appliance with videoconferencing capabilities, such as wall-mounted tablet computer devices in a hardened case.

In addition to providing certain visitation and communication operations, communication processing system 104 may attempt to ensure that a resident's calls, video conferences, online chats, etc. are performed only with nonresidents whose identities, devices, email addresses, phone numbers, etc. are listed in that resident's Pre-Approved Contact (PAC) list. Each resident's PAC list may be stored, for example, in database 132 maintained by Administration and Management System (AMS) 134 (which may be referred to as a Jail Management System (JMS), or the like, in correctional facility implementations). In addition to PAC list(s), AMS 134 may also store inmate or resident profile data (RPD), as well as visitation rules applicable to each resident. As an example, in the context of a correctional facility, database 132 may include information such as balances for inmate trust and calling accounts; trial schedule; conviction data; criminal record; sentencing data, such as time served, time remaining to be served, and release date; cell and cellmate assignments; resident restrictions and warnings; commissary order history; telephone call history; call recordings; known or suspected gang or criminal affiliations; known or suspected affiliates, accomplices, or gang members; and any other information that may be relevant or useful to correctional facility staff to house and maintain residents, such as the unique device IDs created in accordance with embodiments of the present systems and methods.

In some implementations, communication system 104 may be configured to perform communications monitoring operations configured to monitor and or record telephone and/or video visitations (e.g., as electronic files). In scenarios where communication system 104 is located within the controlled-environment facility, it may have direct access to AMS 134. In other embodiments, however, communication system 104 may be located remotely with respect to the controlled-environment facility, and access to AMS 134 may be obtained via a computer network such as, for example, network 124.

In many controlled-environment facilities, residents are restricted from communicating with persons outside of the controlled-environment facility using any device other than the system described above (106, 108 or 110). Reasons for this include protection of persons outside of the controlled-environment facility from offensive, inappropriate, or illegal contact with a resident. Additionally, these restrictions may help to prevent residents from directing further illegal activity with conspirators located outside of the controlled-environment facility, witness tampering, victim protection etc. Administrators of the controlled-environment facility may wish to limit the residents' contact to parties on the resident's PAC list. Nonetheless, residents often find ways of bypassing the approved communication system. For example, contraband communications devices 136 are often smuggled into controlled-environment facilities.

In accordance with embodiments of the present systems and methods, controlled-environment facility 102 may employ a controlled-environment facility wireless communications Managed Access System (MAS) 138. MAS 138 may be a permanent system installed in or in conjunction with subject controlled-environment facility 102, or may be temporary. MAS hardware employs antennas and the like, to continuously monitor communications devices operating in the controlled-environment facility, collecting communications device data, such as IMEI/MEIDs, numbers dialed or texted-to, and/or the like. MAS may generally act as a cell site at/for controlled-environment facility 102, in some embodiments. MAS 138 may be employed in some controlled-environment facility to intercept and manage communications attempted by contraband wireless communications devices (e.g. smuggled-in cell phones, etc.) 136.

Such a MAS may employ (central) cellular data access point 140 (i.e. a cellular antenna). For example, dedicated cellular data access point 140 may be placed within (e.g. in or near a center of controlled-environment facility 102, as diagrammatically illustrated in FIG. 1), or at least near enough to controlled-environment facility 102, such that all mobile communications devices (110, 136, etc.) within the facility, including contraband communications devices (136), identify cellular data access point 140 as the primary base station for the communications cell. In certain embodiments, the power levels and/or antenna beam directionality associated with cellular data access point 140 may be adjusted such that the geographical area of the communications cell corresponds with the area of controlled-environment facility 102. Thus, all cellular communications originating from (and/or terminating) within controlled-environment facility 102 may be directed through MAS 138 or another embodiment of a communications interception device, such as central controlled-environment facility communications processing system 104, connected thereto.

MAS 138 may control communication from and to contraband communications devices without impacting legitimate wireless communications (such as by controlled-environment facility staff wireless communications devices, approved communications devices, or the like) or within designated areas of controlled-environment facility 102. Such a MAS may be a combination of a specially managed cellular telephone system network and a tightly controlled distributed antenna system, central antenna 140, or the like. MAS 138 may employ 2G, 3G, 4G and 5G technologies and protocols used by wireless cellphone carriers. MAS 138 may apply policy rules determined by facility administrators, which may be administered by controlled-environment facility Administration and Management System (AMS) 134 (which may be referred to as a Jail Management System (JMS), in a correctional institution implementation). In accordance with embodiments of the present systems and methods, MAS 138 may capture drone and drone control transmissions 130 and 135, as well as contraband communications data such as contraband communications device IMEI, IMSI, MEID and/or MIN, phone numbers dialed or messaged, and/or the like.

Contraband communications devices assessment system 142 may perform an assessment (audit) of contraband communications device usage in a controlled-environment facility (102). Contraband communications devices assessment system 142 may be temporally deployed within or in conjunction with controlled-environment facility 102 and may employ temporary antennas 144 through 150, or the like, deployed throughout the facility to monitor contraband communications device activity. As with MAS 138 contraband communications devices assessment system 142 may capture contraband communications device IMEI, IMSI, MEID, and/or MIN, phone numbers dialed or messaged, and/or the like.

Embodiments of the present systems and methods are facilitated by collecting as much data as possible about the contraband communications device, such as through MAS 138 or assessment by system 142, and through provisioning of complete call records, such as CDRs, by controlled-environment facility resident communications system 104, AMS 132, MAS 138, etc. That is, unauthorized mobile communications into and or out of controlled-environment facility 102 may be intercepted by MAS 138. In the depicted embodiment, contraband communication device 136 may include, for example, a cell phone, a smartphone device, a tablet computer device, etc. In the embodiment of FIG. 1, contraband communication device 136 may attempt to access an outside wireless communications network via a data or voice connection. In one embodiment, communications originating from within the controlled-environment facility may be directed by MAS 138 through controlled-environment facility resident communications processing system 104, AMS 132, and/or the like, for handling like a conventional resident call. In such embodiments, controlled-environment facility resident communications processing system 104, AMS 132, MAS 138 and/or the like, may perform a variety of security and/or surveillance functions. For example, controlled-environment facility resident communications processing system 104, AMS 132, MAS 138 and/or the like, may facilitate monitoring of communications from contraband communication device 136, may block unauthorized attempts to communicate with outside communications networks, may route communications from contraband communication device 136 through facility communication systems for such monitoring, billing, etc. In particular, with respect to embodiments of the present systems and methods, controlled-environment facility resident communications processing system 104, AMS 132, MAS 138 and/or the like, may collect information related to the attempted access to communications networks, including the date, time, nature of the communication, device IMEI, IMSI, MEID and/or MIN, and/or the like. For example, controlled-environment facility resident communications processing system 104, AMS 132, MAS 138, etc., may record whether the attempted communication was a telephone call, an email, a text message, an attempt to access a website, etc., and further record details of the attempted communication, including a telephone number, email address, web address associated with the attempted communication. Further, controlled-environment facility resident communications processing system 104, AMS 132, MAS 138 and/or the like, may store details of attempted communications, including for example, call detail records (CDRs), recordings of telephone calls, video, images, website access records, etc. in database 132, or the like. In still further embodiments, controlled-environment facility resident communications processing system 104, AMS 132, MAS 138 and/or the like, may access the data stored to derive intelligence from data obtained. For example, controlled-environment facility resident communications processing system 104, AMS 132, MAS 138, etc., may create a linking database to identify relationships between contacts stored in the communication device. Controlled-environment facility resident communications processing system 104, AMS 132, MAS 138 and/or the like, may also identify a list of persons, telephone numbers, addresses, or websites associated with a criminal activity in response to the data collected.

As noted controlled-environment facility MAS 138 and/or the like, may route the attempted communication to communications processing system 104 associated with controlled-environment facility 102, and controlled-environment facility resident communications processing system 104, AMS 132, MAS 138 and/or the like, may handle processing of the attempted communication, such as by determining whether the attempted communication is authorized, whether the attempted communication may be completed, and whether additional functions may be performed on the attempted communication, as described above. In general, controlled-environment facility resident communications processing system 104, AMS 132, MAS 138 and/or the like, may reference a set of predetermined policies or rules associated with intercepted communications. The policies or rules may reflect the preferences of the administration of the controlled-environment facility 102. As noted, controlled-environment facility resident communications processing system 104, AMS 132, MAS 138 and/or the like, may determine whether the attempted communication may be completed or not. For example, a whitelist (e.g. a PAC list) listing for a called number may result in the connection proceeding while a blacklisting of the called number, or the absence of the called number from the whitelist generally prevents the connection from proceeding, except for investigative purposes. Hence, in response to the determination, controlled-environment facility resident communications processing system 104, AMS 132, MAS 138 and/or the like, may either complete the communication or block the communication, or may determine that a call from a contraband communication device will be connected to a called party, but with covert monitoring, or the like. In such embodiments, controlled-environment facility resident communications processing system 104, AMS 132, MAS 138 and/or the like, may connect the call from the unauthorized device to the called party, determine that all calls from an unauthorized cell phone are to be blocked, or the like. Controlled-environment facility resident communications processing system 104, AMS 132, MAS 138 and/or the like, may record and/or monitor the attempted communication once it is connected or completed, may record and/or monitor any information collected from the attempted communication before it is completed may forward the attempted communication, or a copy thereof, to a live agent or third-party monitoring or recording utility, and/or the like. Regardless, in any of the above cases the IMEI and IMSI or MEID and MIN for the contraband communication device 136 (and/or any other devices involved in the communication, such as non-resident devices 112 or 122) are collected, such as through the creation of a CDR, or otherwise, in accordance with the present systems and methods. Further, a device ID created in accordance with embodiments of the present systems and methods may be employed in taking the above-described actions and or in making the above-described decisions.

Consistent with the above and in accordance with embodiments of the present systems and methods, a resulting system for creation of a device ID for mobile communications devices may employ one or more access points configured to monitor wireless/mobile communications and capture equipment identification information and subscriber identification information for mobile communications devices carrying out the wireless/mobile communications. For example, in environment 100 central access point 140 of controlled-environment facility MAS 138 and/or one or more access points 144, 146, 148 and/or 150 of controlled-environment facility contraband mobile communications device assessment system 142 may be employed to capture equipment identification information and subscriber identification information for mobile communications devices operating in, or in association with, controlled-environment facility 102, such as device IMEI and IMSI, respectively or MEID and MIN, respectively. Such mobile communications devices operating in association with the controlled-environment facility may include (contraband) mobile communications devices 138 carrying out, or attempting to carry out, mobile communications within controlled-environment facility 102 and/or communications devices outside the controlled-environment facility carrying out communications with (contraband) mobile communications devices within the controlled-environment facility. Residents (inmates) of controlled-environment facilities (correctional facilities) may pass around a contraband communications device and each may use his or her own activated (contraband) SIM card, and/or each resident may have their own contraband communications device and the they may pass around a currently activated SIM card. In either case, as noted, the device and SIM pairings each make a unique device and/or event under the present systems and methods, for which a unique device ID (device identity) may be created in accordance with embodiments of the present systems and methods.

As noted, the equipment identification information may be an IMEI for each of some of the mobile communications devices for which identification information is captured. In such cases, the subscriber identification information will be an IMSI for the corresponding mobile communications device for which identification information is captured. In other cases, the equipment identification information will be a MEID for each of some (e.g. the rest) of the mobile communications devices for which identification information is captured and the subscriber identification information will be a MIN for the corresponding mobile communications devices in such cases. These mobile communications devices may be operating in association with a controlled-environment facility, such as contraband mobile communications devices operating within the controlled-environment facility, and/or may be communications devices communicating with such contraband mobile communications devices operating within the controlled-environment facility. In such embodiments, the equipment identification information and subscriber identification information may be captured by a controlled-environment facility mobile communications access system and/or by a controlled-environment facility contraband mobile communications device assessment system.

Communications device analysis module 152, or the like, which, as illustrated, may be a part of controlled-environment facility resident communications processing system 104 in environment 100 (but, which may additionally or alternatively be a part of AMS 132, MAS 138 and/or the like), may be configured to combine the captured equipment identification information and subscriber identification information for each mobile communications device to create a device ID for each pairing of equipment identification information and subscriber identification information captured. This unique device identity, as single number or identifier, may be used more readily in the above-described analytical or call handling processes and/or more easily used in user interfaces related thereto.

Thus, in accordance with embodiments of the present systems and methods, software, firmware modifications (updates, upgrades, etc.), or the like, may be employed to modify an existing controlled-environment facility MAS (138) and/or contraband mobile communications device assessment system (142) to monitor wireless/mobile communications originating in and/or terminating within the controlled-environment facility, or the like. In accordance with such embodiments of the present systems and methods, equipment identification information and subscriber identification information, such as IMEI and IMSI, respectively, or MEID and MIN, respectively, for each mobile communications device monitored may be captured for such devices operating within controlled-environment facility 102 and/or monitored as communicating with each mobile communications device operating within controlled-environment facility 102.

MAS (138) and/or contraband mobile communications device assessment system (142), and/or other systems associated with such as controlled-environment facility resident communications processing system 104 (such as, analysis module 152 thereof), AMS 134, and/or the like, may combine the captured equipment identification information and subscriber identification information for each mobile communications device. This creates a device ID for each pairing of equipment identification information and subscriber identification information for mobile communications devices operating within the controlled-environment facility. Such functionality may combine the equipment identification information and subscriber identification information captured for each mobile communications device by performing a mathematical operation to combine the subscriber identification information and equipment identification information to create the device ID for each pairing of equipment identification information and subscriber identification information captured. Alternatively, this functionality may combine the equipment identification information and subscriber identification information captured for each mobile communications device by appending elements of each of the subscriber identification information and the equipment identification information together to create the device ID for each pairing of subscriber identification information and equipment identification information captured.

FIG. 2 is a flowchart of example implementation 200 of a process for creation and use of a device ID for mobile communications devices in accordance with some embodiments of the present systems and methods. Therein, both equipment identification information and subscriber identification information for mobile communications devices are captured at 202. As noted, this equipment identification information may be an IMEI for each of some of the mobile communications devices for which identification information is captured. In such cases, the subscriber identification information will be an IMSI for the corresponding mobile communications device for which identification information is captured. In other cases, the equipment identification information will be a MEID for each of some (e.g. the rest) of the mobile communications devices for which identification information is captured and the subscriber identification information will be a MIN for the corresponding mobile communications devices in such cases. These mobile communications devices may be operating in association with a controlled-environment facility, such as contraband mobile communications devices operating within the controlled-environment facility, and/or may be communications devices communicating with such contraband mobile communications devices operating within the controlled-environment facility. In such embodiments, the equipment identification information and subscriber identification information may be captured by a controlled-environment facility mobile communications access system (138) and/or by a controlled-environment facility contraband mobile communications device assessment system (142).

At 204 the equipment identification information and subscriber identification information captured for each mobile communications device are combined to create a device ID at 206 for each pairing of equipment identification information and subscriber identification information captured at 202. In controlled-environment facility embodiments, such as discussed above, the device ID for each pairing of a equipment identification information and subscriber identification information for mobile communications captured may be for mobile communication devices (110, 136) operating in association with a controlled-environment facility (102), such as contraband mobile communications devices (136) operating within the controlled-environment facility, and/or may be communications devices communicating with such contraband mobile communications devices operating within the controlled-environment facility.

Combining the equipment identification information and subscriber identification information captured for each mobile communications device at 204 may include performing a mathematical operation, such as a decimal or hexadecimal operation, to combine the subscriber identification information and equipment identification information together to create the device ID for each pairing of equipment identification information and subscriber identification information at 206. Alternatively, combining the equipment identification information and subscriber identification information captured for each mobile communications device at 204 may include appending elements of each of the subscriber identification information and the equipment identification information together to create the device ID for each pairing of subscriber identification information and equipment identification information at 206. Other methods of a mathematical, compositional, syntactic, or other nature may be employed for creating the unique device identity, in accordance with embodiments of the present systems and methods. By way of example, a hash function may be executed on, or using, one or both of the identifiers before, after and/or as a part of combining the information at 204 to provide the unique device identity at 206.

Equipment identification information and subscriber identification information for legitimately used mobile communications devices (110) may be captured at 202 and combined at 204, as well as for contraband communications devices (136) and outside devices connected to such contraband communications devices, to provide the unique paired device identity at 206. In such cases, the device identity may be used in exclusion of such devices (110) in various call management processes in accordance with embodiments of the present systems and methods. For example, at 208 the device ID generated at 206 may be used in communications analysis to perform faster and easier analysis than the time and effort to evaluate two different equipment and subscriber identifiers, such as IMEI and IMSI, respectively or MEID and MIN, respectively.

Embodiments of the present systems and methods for creation and use of unique mobile communications device identity, as described herein, may be implemented or executed, at least in part, by one or more computer systems. One such computer system is illustrated in FIG. 3. In various embodiments, computer system 300 may be a server, a mainframe computer system, a workstation, a network computer, a desktop computer, a laptop, a tablet computing device, media player, or the like. For example, in some cases, computer 300 may implement one or more steps of example process 200 described above with respect to the flowchart of FIG. 2, and/or a computer system such as computer system 300 may be used as, or as part of, one or more of controlled-environment facility resident communications processing system 104, AMS 134, MAS 138, contraband communications devices assessment system 142, and/or the like. In various embodiments two or more of these computer systems may be configured to communicate with each other in any suitable way, such as, for example, via a network, such as via a local area network, and/or using wireless functionality).

As illustrated, example computer system 300 includes one or more processors 310 coupled to a system memory 320 via an input/output (I/O) interface 330. Example computer system 300 further includes a network interface 340 coupled to I/O interface 330, and one or more input/output devices 350, such as video device(s) 360 (e.g., a camera), audio device(s) 370 (e.g., a microphone and/or a speaker), and display(s) 380. Computer system 300 may also include a cursor control device (e.g., a mouse or touchpad), a keyboard, etc. Multiple input/output devices 350 may be present in computer system 300 or may be distributed on various nodes of computer system 300. In some embodiments, similar input/output devices may be separate from computer system 300 and may interact with one or more nodes of computer system 300 through a wired or wireless connection, such as over network interface 340.

In various embodiments, computer system 300 may be a single-processor system including one processor 310, or a multi-processor system including two or more processors 310 (e.g., two, four, eight, or another suitable number). Processors 310 may be any processor capable of executing program instructions. For example, in various embodiments, processors 310 may be general-purpose or embedded processors implementing any of a variety of instruction set architectures (ISAs), such as the x86, POWERPC®, ARM®, SPARC®, or MIPS® ISAs, or any other suitable ISA. In multi-processor systems, each of processors 310 may commonly, but not necessarily, implement the same ISA. Also, in some embodiments, at least one processor 310 may be a graphics processing unit (GPU) or other dedicated graphics-rendering device.

System memory 320 may be configured to store program instructions and/or data accessible by processor 310. In various embodiments, system memory 320 may be implemented using any suitable memory technology, such as static random access memory (SRAM), synchronous dynamic RAM (SDRAM), nonvolatile/Flash-type memory, or any other type of memory. As illustrated, program instructions and data implementing certain operations, such as, for example, those described in connection with FIGS. 1 and 2, above, may be stored within system memory 320 as program instructions 325 and data storage 335, respectively. In other embodiments, program instructions and/or data may be received, sent or stored upon different types of computer-accessible media or on similar media separate from system memory 320 or computer system 300. Generally speaking, a computer-readable medium may include any tangible or non-transitory storage media or memory media such as magnetic or optical media—e.g., disk or CD/DVD-ROM coupled to computer system 300 via I/O interface 330, Flash memory, random access memory (RAM), etc. Program instructions and data stored on a tangible computer-accessible medium in non-transitory form may further be transmitted by transmission media or signals such as electrical, electromagnetic, or digital signals, which may be conveyed via a communication medium such as a network and/or a wireless link, such as may be implemented via network interface 340.

In some embodiments, I/O interface 330 may be configured to coordinate I/O traffic between processor 310, system memory 320, and any peripheral devices in the device, including network interface 340 or other peripheral interfaces, such as input/output devices 350. In some embodiments, I/O interface 330 may perform any suitable protocol, timing or other data transformations to convert data signals from one component (e.g., system memory 320) into a format usable by another component (e.g., processor 310). In some embodiments, I/O interface 330 may include support for devices attached through various types of peripheral buses, such as a variant of the Peripheral Component Interconnect (PCI) bus standard or the Universal Serial Bus (USB) standard, for example. In some embodiments, the function of I/O interface 330 may be split into two or more separate components, such as a north bridge and a south bridge, for example. In addition, in some embodiments, some or all of the functionality of I/O interface 330, such as an interface to system memory 320, may be incorporated into processor 310.

Network interface 340 may be configured to allow data to be exchanged between computer system 300 and other devices attached to a network, such as other computer systems, or between nodes of computer system 300. In various embodiments, network interface 340 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

As shown in FIG. 3, memory 320 may include program instructions 325, configured to implement certain embodiments described herein, and data storage 335, comprising various data accessible by program instructions 325. In an embodiment, program instructions 325 may include software elements corresponding to one or more of the various embodiments illustrated in the above figures. For example, program instructions 325 may be implemented in various embodiments using any desired programming language, scripting language, or combination of programming languages and/or scripting languages (e.g., C, C++, C#, JAVA®, JAVASCRIPT®, PERL®, etc.). Data storage 335 may include data that may be used in these embodiments. In other embodiments, other or different software elements and data may be included.

A person of ordinary skill in the art will appreciate that computer system 300 is merely illustrative and is not intended to limit the scope of the disclosure described herein. In particular, the computer system and devices may include any combination of hardware or software that can perform the indicated operations. Additionally, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system configurations.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for creation and use of a device identity for mobile communications devices, the method comprising:
    capturing, by a controlled-environment facility mobile communications managed access system and/or by a controlled-environment facility contraband mobile communications device assessment system, an international mobile station equipment identity and an international mobile subscriber identity or a mobile equipment identifier and a mobile identification number for mobile communications devices operating in association with a controlled-environment facility;
    performing, by a communications device analysis module, a decimal or hexadecimal mathematical operation or hash function to combine the international mobile station equipment identity and the international mobile subscriber identity or to combine the mobile equipment identifier and the mobile identification number or appending elements of each of the international mobile station equipment identity and the international mobile subscriber identity or each of the mobile equipment identifier and the mobile identification number captured for each mobile communications device together, to create a device identity number for each pairing of international mobile station equipment identity and international mobile subscriber identity or mobile equipment identifier and mobile identification number captured;
    associating, by the communications device analysis module, each device identity number with at least one call; and
    identifying, by an analytical platform, a controlled-environment facility resident using a particular mobile communications device and a particular subscriber identity or mobile identification number combination based on a number called by, or calling, in an associated call.

2. The method of claim 1, wherein the mobile communications devices operating in association with a controlled-environment facility are contraband mobile communications devices.

3. The method of claim 1, wherein the mobile communications devices operating in association with a controlled-environment facility are contraband mobile communications devices operating in the controlled-environment facility.

4. The method of claim 1, wherein identifying the controlled-environment facility resident using the particular mobile communications device and the particular subscriber identity or mobile identification number identifies the controlled-environment facility resident using a particular subscriber identity module or subscriber identification module.

5. The method of claim 1, further comprising, prior to identifying the controlled-environment facility resident using the particular mobile communications device and the particular subscriber identity or mobile identification number identification combination:
    determining, by the communications device analysis module, each device identity number associated with controlled-environment facility approved mobile communications devices; and determining, by the communications device analysis module, that each mobile communications device associated with device identity numbers not associated with controlled-environment facility approved mobile communications devices is a contraband mobile communications device.

6. A system for creation and use of a device identity for mobile communications devices comprising:
   a central access point of a controlled-environment facility mobile communications managed access system, and/or one or more access points of a controlled-environment facility contraband mobile communications device assessment system, configured to monitor mobile communications and capture an international mobile station equipment identity and an international mobile subscriber identity or a mobile equipment identifier and a mobile identification number for mobile communications devices operating in association with the controlled-environment facility; and
   a communications device analysis module configured to:
      combine a captured international mobile station equipment identity and international mobile subscriber identity or a captures mobile equipment identifier and mobile identification number for each mobile communications device to create a device identity number for each pairing of international mobile station equipment identity and international mobile subscriber identity or mobile equipment identifier and mobile identification number captured for the mobile communication devices operating in association with the controlled-environment facility, by performing a decimal or hexadecimal mathematical operation or hash function on, or by appending elements of each of, the international mobile station equipment identity and international mobile subscriber identity or the mobile equipment identifier and mobile identification number;
      determine each device identity number associated with controlled-environment facility approved mobile communications devices; and
      determine that each mobile communications device associated with device identity numbers not associated with controlled-environment facility approved mobile communications devices is a contraband mobile communications device.

7. The system of claim 6, wherein the mobile communications devices operating in association with the controlled-environment facility are operating within the controlled-environment facility.

8. The system of claim 6, wherein the analysis module if further configured to associate each device identity number with at least one call and the system further comprises an analytical platform configured to identify a controlled-environment facility resident using a particular mobile communications device and a subscriber identity module or subscriber identification module combination based on a number called by, or calling, in an associated call.

9. A non-transitory computer-readable storage medium having program instructions stored thereon that, upon execution by a controlled-environment facility mobile communications managed access system and/or a controlled-environment facility contraband mobile communications device assessment system, causes the controlled-environment facility mobile communications managed access system and/or the controlled-environment facility contraband mobile communications device assessment system to:
   monitor mobile communications originating in and/or terminating within the controlled-environment facility;
   capture an international mobile station equipment identity and international mobile subscriber identity or a mobile equipment identifier and mobile identification number for each mobile communications device monitored as operating within the controlled-environment facility and/or monitored as communicating with a mobile communications device operating within the controlled-environment facility;
   combine the international mobile station equipment identity and international mobile subscriber identity or mobile equipment identifier and mobile identification number captured for each mobile communications device to create a device identity number for each pairing of international mobile station equipment identity and international mobile subscriber identity or mobile equipment identifier and mobile identification number for mobile communications devices operating within the controlled-environment facility and/or communicating with a mobile communications device operating within the controlled-environment facility, by performing a decimal or hexadecimal mathematical operation or hash function on, or by appending elements of each of, the international mobile station equipment identity and international mobile subscriber identity or the mobile equipment identifier and mobile identification number;
   determine, by a communications device analysis module, each device identity number associated with controlled-environment facility approved mobile communications devices;
   determine, by the communications device analysis module, that each mobile communications device associated with device identity numbers not associated with controlled-environment facility approved mobile communications devices is a contraband mobile communications device; and
   allow communications by controlled-environment facility approved mobile communications devices.

10. The non-transitory computer-readable storage medium of claim 9, wherein the program instructions further cause the controlled-environment facility mobile communication managed access system and/or the controlled-environment facility contraband mobile communications device assessment system to associate each device identity number with at least one call and the program instructions further cause an analytical platform to identify a controlled-environment facility resident using a particular mobile communications device and a subscriber identity module or subscriber identification module combination based on a number called by, or calling, in an associated call.

* * * * *